United States Patent
Mocko et al.

(10) Patent No.: US 10,055,721 B1
(45) Date of Patent: Aug. 21, 2018

(54) REPLICATING ONLINE-TRANSACTION BEHAVIOR IN OFFLINE TRANSACTIONS

(71) Applicant: Square, Inc., San Francisco, CA (US)

(72) Inventors: Christopher Lang Mocko, San Francisco, CA (US); Michael Wells White, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 872 days.

(21) Appl. No.: 14/274,524

(22) Filed: May 9, 2014

(51) Int. Cl.
*G06Q 20/20* (2012.01)

(52) U.S. Cl.
CPC .......... *G06Q 20/202* (2013.01); *G06Q 20/20* (2013.01)

(58) Field of Classification Search
CPC .............................. G06Q 20/202; G06Q 20/20
See application file for complete search history.

(56) References Cited

U.S. PATENT DOCUMENTS

| | | | | |
|---|---|---|---|---|
| 5,692,233 A * | 11/1997 | Garman | .................. | G06Q 40/00 705/35 |
| 6,096,096 A * | 8/2000 | Murphy | ............ | G06F 17/30899 703/23 |
| 9,037,491 B1 * | 5/2015 | Lee | ...................... | G06Q 20/204 705/17 |
| 2002/0194590 A1 * | 12/2002 | Pong | ........................ | H04N 7/16 725/32 |
| 2004/0015954 A1 * | 1/2004 | Tuerke | .................... | H04L 67/02 717/173 |
| 2006/0031466 A1 * | 2/2006 | Kovach | ............... | H04L 43/0864 709/224 |
| 2007/0255617 A1 * | 11/2007 | Maurone | ............ | G06Q 30/0277 705/14.73 |
| 2010/0318446 A1 * | 12/2010 | Carter | .................. | G06Q 20/105 705/30 |
| 2011/0166997 A1 * | 7/2011 | Dixon | .................. | G06Q 20/105 705/41 |
| 2012/0166311 A1 * | 6/2012 | Dwight | .............. | G06Q 30/0613 705/26.43 |
| 2013/0346244 A1 * | 12/2013 | Nuzzi | .................... | G06Q 30/06 705/26.41 |
| 2014/0006194 A1 * | 1/2014 | Xie | ..................... | G06Q 20/3278 705/21 |
| 2014/0019274 A1 * | 1/2014 | Hardin | ................... | G06Q 20/20 705/21 |
| 2014/0032415 A1 * | 1/2014 | Lee | ........................ | G06Q 20/20 705/44 |
| 2014/0114853 A1 * | 4/2014 | Guedj | .................... | G06Q 20/12 705/44 |
| 2015/0081462 A1 * | 3/2015 | Ozvat | .................. | G06Q 20/027 705/21 |
| 2015/0149309 A1 * | 5/2015 | Lee | ...................... | G06Q 20/204 705/17 |
| 2015/0170132 A1 * | 6/2015 | Patel | ...................... | G06Q 20/40 705/44 |
| 2015/0278795 A1 * | 10/2015 | Jiang | ...................... | G06Q 20/32 705/44 |

(Continued)

Primary Examiner — Asfand M Sheikh
(74) Attorney, Agent, or Firm — Lee & Hayes, PLLC (57) ABSTRACT

Techniques and arrangements for replicating behavior of a point-of-sale (POS) device operating in an offline mode with behavior of the POS device operating in an online mode. For instance, the techniques may insert an artificial delay into an offline transaction, thus causing an end-to-end processing time of an offline transaction to more closely match an end-to-end processing time of an online transaction.

22 Claims, 5 Drawing Sheets

(56) References Cited

U.S. PATENT DOCUMENTS

| | | | |
|---|---|---|---|
| 2015/0348040 A1* | 12/2015 | Bhorania | G06Q 20/4016 |
| | | | 705/16 |
| 2016/0094497 A1* | 3/2016 | Javed | H04W 4/18 |
| | | | 709/206 |
| 2016/0110718 A1* | 4/2016 | Jajara | G06Q 20/322 |
| | | | 705/44 |
| 2016/0335618 A1* | 11/2016 | Koh | G06Q 20/206 |

\* cited by examiner

REPLICATING ONLINE-TRANSACTION BEHAVIOR IN OFFLINE TRANSACTIONS

BACKGROUND

In today's commerce, merchants often utilize an array of different point-of-sale (POS) devices, including mobile POS devices. Merchants may use these mobile POS devices to engage in transactions with customers at different locations. For instance, a taxi driver may use a mobile POS device to charge a passenger for a taxi ride. In another example, a street vendor may use a mobile POS device to charge a customer for an item purchased from the street vendor. In part because of the mobile nature of these POS devices, the POS devices may sometimes lack network connectivity and, hence, may operate in an offline mode, as opposed to an online mode.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

As described above, point-of-sale (POS) devices may operate in both online and offline modes. However, end users of the POS devices, such as merchants and customers, may have different experiences depending on whether the POS devices operate in the online mode or the offline mode. The difference between these experiences may result in unwanted side effects.

Therefore, some implementations described herein include techniques and arrangements for replicating behavior of a point-of-sale (POS) device operating in an offline mode with behavior of the POS device operating in an online mode. For instance, the techniques may insert an artificial delay into an offline transaction, thus causing an end-to-end processing time of an offline transaction to more closely match an end-to-end processing time of an online transaction.

To conduct a transaction, a merchant may receive a payment instrument from a customer to pay for a good or service that the customer receives from the merchant. The merchant may then input an identifier associated with the payment instrument into a POS device by, for example, swiping the payment instrument, typing in a number of the payment instrument, or the like. When the POS device is operating in an online mode, the POS device sends information regarding identifier of the payment instrument to a payment service for authorization of the payment instrument. In some instances, the POS device sends this information over a network to the payment instrument substantially contemporaneously with the POS device receiving the identifier of the payment instrument. After receiving the information, the payment service may then attempt to authorize the payment instrument for the amount of the transaction. After determining whether the payment instrument is approved or declined, the payment service sends a corresponding indication over the network to the POS device. As such, when the POS device operates in the online mode, a time delay exists between a time from which the POS device receives the identifier of the payment instrument and a time at which the POS device displays whether the payment instrument is approved.

When the POS device operates in the offline mode, however, the POS device locally stores the information regarding the identifier of the payment instrument for later sending to the payment service after the POS device transitions into the online mode. That is, when a customer of the merchant provides a payment instrument to the merchant, the merchant swipes or otherwise inputs the payment-instrument identifier into the POS device, which may then substantially immediately store this information and display, to the merchant, that the transaction has been completed (at least until the POS device transitions to the online mode). As such, without the techniques described below, the amount of time between the POS device receiving the payment-instrument identifier and displaying the success (or failure) of the transaction may differ substantially between the online and offline modes.

That is, because the POS device sends information to the payment service and awaits a response prior to displaying whether the payment instrument is approved in the online mode, and relatively immediately displays that a transaction is completed in the offline mode, the end-to-end processing time may be relatively greater in the online mode as compared to the offline mode. In some instances, a customer of the merchant may notice this differential and, therefore, may know with a high degree of certainty when the POS device is operating in the offline mode. With this information, a shrewd customer may be inclined to provide a fraudulent or invalid payment instrument, knowing that the merchant will not learn of its invalidity until well after the customer has left the proximity of the merchant (and the POS device transitions to the online mode).

To lessen the chance that a customer is able to differentiate between the POS device operating in the online mode and the offline mode—and the risk that the customer will defraud the merchant—the techniques described herein cause the POS device to appear to function the same regardless of whether the POS device is in the online mode or the offline mode.

For example, the techniques described below may determine how long it typically takes a POS device to process a transaction in the online mode and then may add an artificial delay into the processing pipeline of transactions processed in the offline mode. For instance, if a POS device operating in the online mode typically indicates, after receiving a payment instrument, whether the payment instrument is approved in about two seconds, then the POS device operating in the offline mode may be configured to wait two seconds after receiving a payment instrument before indicating that the transaction has been completed. Of course, while the techniques may insert an artificial time delay, the techniques may harmonize the behavior of the POS device across online and offline transactions in any other number of ways.

For discussion purposes, some example implementations are described below with reference to the corresponding figures. However, implementations herein are not limited to the particular examples provided, and may be extended to other environments, other system architectures, other types of merchants, and so forth, as will be apparent to those of skill in the art in light of the disclosure herein.

Figure 1:
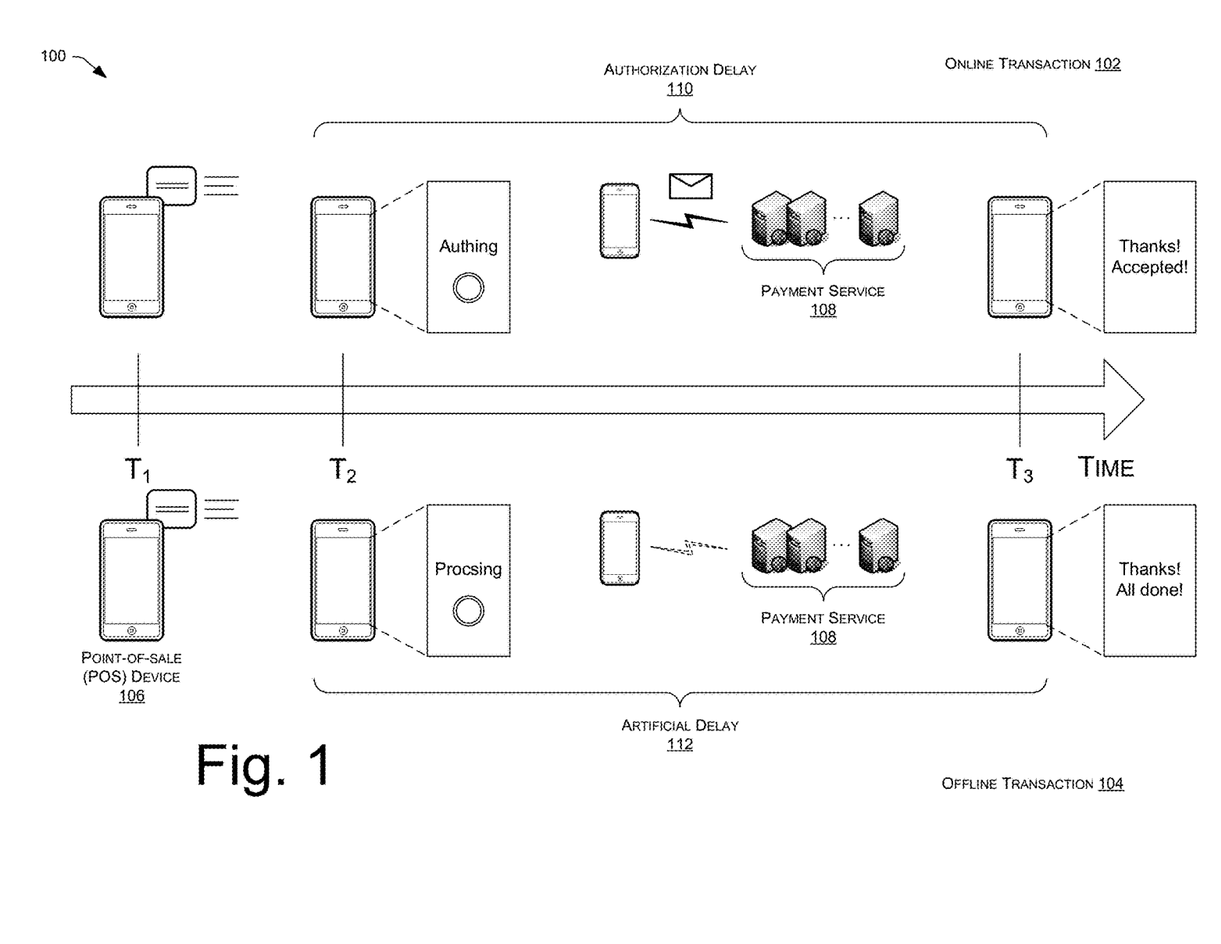
FIG. 1 illustrates a side-by-side comparison of a point-of-sale (POS) device conducting an online transaction and an offline transaction. As illustrated, the POS device may insert an artificial delay to cause the offline-transaction experience to more closely replicate the online-transaction experience.

FIG. 1 illustrates a scenario along a timeline 100 where a POS device 106 engages in an online transaction 102 (illustrated on a top half of the timeline 100) and in an offline transaction 104 (illustrated on a bottom half of the timeline). While FIG. 1 illustrates the online and offline transactions along the same timeline 100, it is to be appreciated that the timeline 100 simply illustrates the length of time to process these different transaction types relative to one another, and not that the these transactions are occurring at a same exact time.

At a time $T_1$, both the online transaction 102 and the offline transaction 104 illustrate the POS device 106 receiving a payment instrument—in this case a payment card, such as a credit card, a debit card, a stored-valued card, or the like. At $T_2$, in the online transaction 102 the POS device 106 indicates that the POS device 106 is currently attempting to authorize the payment instrument for an amount of the transaction 102. That is, the POS device 106 may be sending, over a network and to a payment service 108, information regarding the payment instrument and an indication of a cost of the transaction to allow the payment service to determine whether the payment instrument should be approved or declined. To do so, the payment service 108 may communicate with several entities as discussed below, such as a card payment network, an issuing bank associated with the payment card, or the like.

After determining whether the payment instrument is approved or declined, the payment service 108 provides a corresponding indication back to the POS device 106. As illustrated, in the current example the POS device 106 displays, at $T_3$, that the payment instrument has been approved.

Also as illustrated, the time between the time of sending the transaction information at $T_1$ and receiving an indication of approval $T_3$ is an amount of time denoted as an authorization delay 110. The actual value of the authorization delay 110 may vary based on a number of factors, including processing capabilities of the POS device 106, network latency, and the like.

Moving to the offline transaction 104 example, at $T_2$, and after receiving the payment instrument $T_1$, the POS device 106 indicates that the POS device 106 is "processing" the payment instrument. In some instances, the language in the offline transaction 104 differs from the language in the online transaction 102, given that the offline transaction involves storing the transaction information for later authorization.

Further, because the offline transaction 104 involves the POS device 106 locally storing the transaction information rather than sending it to the payment service 110, the amount of time between $T_2$ and $T_3$ would ordinarily be much less than the authorization delay 110. However, as shown, the POS device 106 inserts an artificial delay 112 so as to lengthen the amount of time between $T_2$ and $T_3$ in the offline transaction 104 to closely approximate the authorization delay 110. As such, a customer of the merchant associated with the POS device 106 may be unlikely to notice the difference between the online transaction 102 and the offline transaction 104 in terms of processing time.

Figure 2:
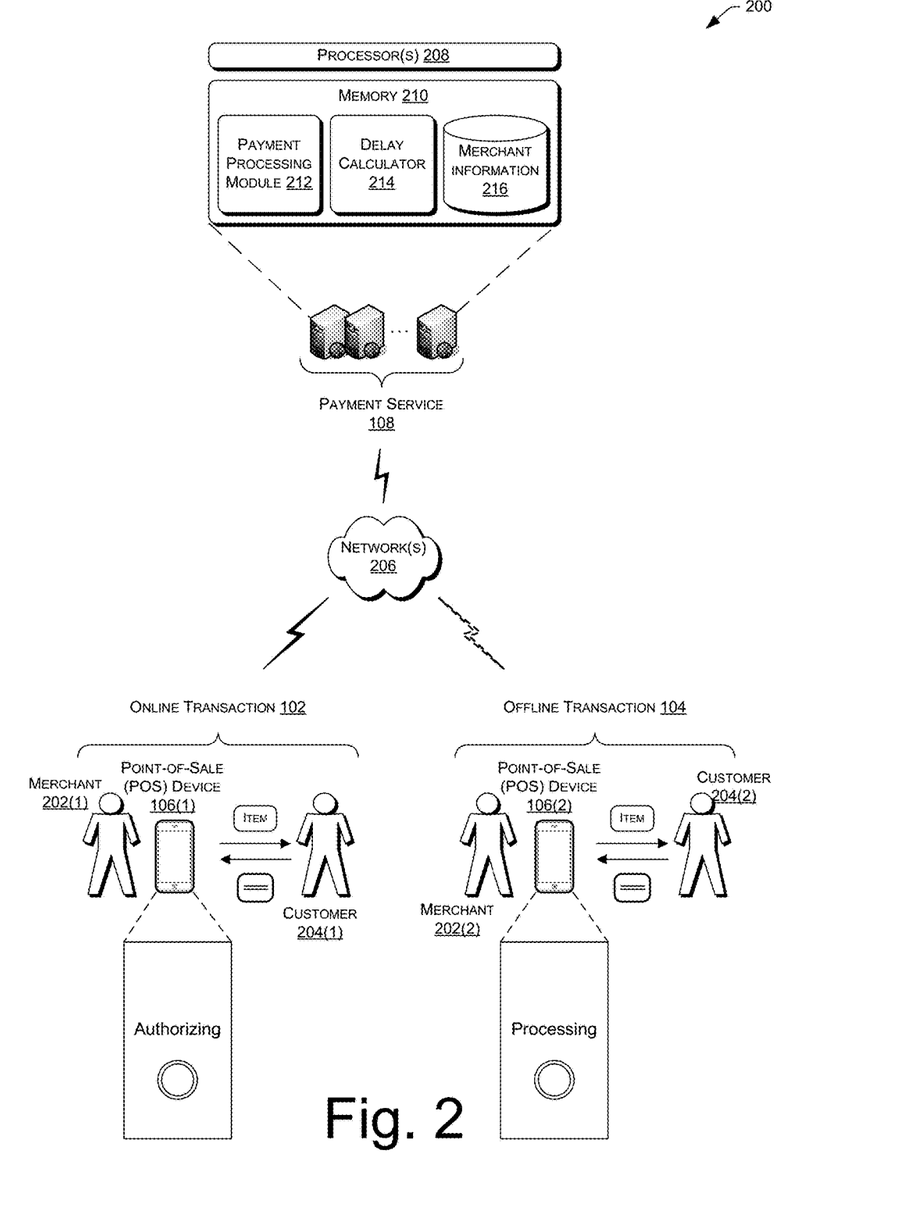
FIG. 2 illustrates an example environment that includes a first merchant operating a first POS device to conduct an online transaction with a first customer and a second merchant operating a second POS device to conduct an offline transaction with a customer. The environment also includes a payment service that communicates with the POS devices to authorize payment instruments used by the customers in the respective transactions.

FIG. 2 illustrates an example environment 200 that includes merchants 202(1) and 202(2) engaging in transactions with customers 204(1) and 204(2), respectively, using POS devices 106(1) and 106(2), respectively. As illustrated, the merchant 202(1) engages in the online transaction 102 with the customer 204(1), while the merchant 202(2) engages in the offline transaction 104 with the customer 204(2).

The POS devices 106(1) and 106(2) may comprise any sort of mobile or non-mobile device that includes an instance of a merchant application that executes on the respective device. The merchant application may provide POS functionality to the POS devices to enable the merchants 202(1) and 202(2) (e.g., an owner, employees, etc.) to accept payments from customers, such as the customers 204(1) and 204(2). In some types of businesses, the POS devices may correspond to a store or other place of business of the merchants, and thus, may be a fixed location that typically does not change on a day-to-day basis. In other types of businesses, however, a POS device may change from time to time, such as in the case that a corresponding merchant operates a food truck, is a street vendor, a cab driver, etc., or has an otherwise mobile business, e.g., in the case of merchants who sell items at buyer's homes, places of business, and so forth.

As used herein, a merchant may include any business engaged in the offering of goods or services for acquisition by customers. Actions attributed to a merchant may include actions performed by owners, employees, or other agents of the merchant and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant.

As used herein, a transaction may include a financial transaction for the acquisition of goods and/or services that is conducted between a customer and a merchant. For example, when paying for a transaction, the customer can provide the amount that is due to the merchant using a payment instrument (e.g., a debit card, a credit card, a stored-value or gift card, a check, through an electronic payment application on a device carried by the customer, or the like). The merchants 202(1) and 202(2) can interact with the respective POS devices 106(1) and 106(2) to process the transaction, such as by inputting (e.g., manually, via a magnetic card reader or an RFID reader, etc.) an identifier associated with the payment instrument. For example, a payment instrument of the customer 204(1) or the customer 204(2) may include one or more magnetic strips for providing card and customer information when swiped in a card reader. In other examples, other types of payment cards may be used, such as smart cards having a built-in memory chip, a radiofrequency identification tag, or so forth.

During a transaction, the POS device can determine transaction information describing the transaction, such as the identifier of the payment instrument, an amount of payment received from the customer, the item(s) acquired by the customer, a time, place and date of the transaction, and so forth. The POS device can send the transaction information to the payment service, either substantially contemporaneously with the conducting of the transaction (in the case of online transactions) or later when the POS device is in the online mode (in the case offline transactions).

In the illustrated example of the offline transaction 104, the POS device 106(1) may store one or more characteristics associated with the transaction (i.e., the transaction information), such as a cost of the transaction, a time of day at which the transaction occurred, a day of the week at which the transaction occurred, a location at which the transaction took place, an item that the customer 204(2) obtained, a payment instrument used in the transaction, and a reason as to why the device is operating in the offline mode. The latter characteristic may indicate, for example, whether the POS device 106(2) lacks network connectivity based on the current location of the device 106(2) (i.e., network connectivity is unavailable), whether the POS device 106(2) lacks network connectivity based on the merchant 202(2) turning or switching off WiFi, whether the POS device 106(2) been transitioned to the offline mode in response to the merchant 202(2) requesting this mode on the merchant application executing on the POS device 106(2), or the like.

After conducting the example illustrated transaction with the customer 204(2), the POS device 106(2) may provide the stored information to the payment service 108 over a network 206. The network 206 may represent any one or more wired or wireless networks, such as a WiFi network, a cellular network, or the like.

As contrasted with the offline transaction 104, the POS device 106(1) may send the transaction information to the payment service 108 and over the network substantially contemporaneously with receiving the payment instrument from the customer 204(1). As such, the merchant 202(1) learns fairly quickly, in the online transaction 102 example, whether the payment instrument provided by the customer 204(1) has been approved.

As illustrated, the payment service 108 may include one or more processors 208 and memory 210, which may store a payment processing module 212, a delay calculator, and merchant information 216 corresponding to respective merchants. The payment processing module 212 may function to receive information regarding a respective transaction from a POS device and attempt to authorize the payment instrument used to conduct the transaction. The payment processing module 212 may then send an indication of whether the payment instrument has been approved or declined back to the POS device.

Generally, when a customer and a merchant enter into an electronic payment transaction, the transaction is processed by electronically transferring funds from a financial account associated with the customer to a financial account associated with the merchant. As such, the payment processing module 212 may communicate with one or more computing devices of a card payment network, e.g., MasterCard®, VISA®, over the network 206 to conduct financial transactions electronically. The payment processing module 212 can also communicate with one or more computing devices of one or more banks over the network 206. For example, the payment processing module 212 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

The delay calculator 214, meanwhile, calculates an artificial delay to insert into the processing of an offline transaction, such as the offline transaction 104. In some instances, the delay calculator 214 makes this determination based at least in part on processing times of multiple previous online transactions made by POS devices. For instance, the delay calculator 214 may calculate the average time it takes to: (1) send, from a POS device and to the payment service 108, information regarding a payment instrument used to satisfy a cost of a particular transaction; (2) receive, at the POS device and from the payment service 108, an indication of whether payment instrument used to satisfy the cost of the previous transaction was approved or declined (which may involve the payment processing module 212 communicating with computing devices of a card payment network, an issuing bank, etc.), and (3) present, on the display of the POS device, the indication of whether the payment instrument used to satisfy the cost of the previous transaction was approved or declined. After calculating this amount (e.g., the "authorization delay 110" from FIG. 1), the delay calculator 214 may instruct one or more POS devices to insert an artificial delay equal to or based on this amount of time when processing transactions in the offline mode. In some instances, the POS devices insert a degree of randomness into the processing delay to emulate the fact that authorization delays for online transaction can also vary. That is, the POS device may add or subtract a small amount of time from the calculated delay so that the offline processing times themselves differ from one another.

In some instances, the delay calculator 214 calculates artificial delays to implement for a large group of POS devices or each device of the environment 100, while in other instances the calculator 214 may calculate a custom artificial delay for one POS device or a small group of devices. In these instances, the delay calculator 214 may reside in whole or in part on the POS device itself. For instance, the POS device 106(2) may calculate an artificial delay to insert into the processing of the offline transaction 104. In this example, the device 106(2) may calculate the delay based on previous authorization delays at the POS device 106(2) during online transactions.

In still other instances, the delay calculator 214 may calculate artificial delays to implement based on a group of similarly situated POS devices. For instances, POS devices in a first geographical area may implement an artificial delay having a first value, while POS devices in a second geographical area may implement an artificial delay having a second, different value. This difference may be based on authorization delays for POS devices at the different areas based on network latency at each respective geographical location. In addition or in the alternative, the different delays may correspond to different types of specifications of POS devices, such that POS devices of a certain class or having certain specifications will insert a common or near-common artificial delay (which one might expect given their similarity).

In addition to inserting a time delay, the POS devices may alter the user experience of the offline transaction 104 in order to better emulate the online transaction 102. For instance, a POS device conducting an offline transaction might not automatically accept a payment instrument in the offline mode. Instead, it may determine a decline rate (e.g., generally, for the particular POS device, for similar merchants, etc.) and may apply the decline rate to the payment instruments received in the offline mode. Therefore, a same or similar percentage of transactions made in the offline mode may be declined, thus more closely replicating the online experience. In some instances, however, the POS device (e.g., via the display) may instruct the merchant to "swipe" the payment instrument once again and, on the subsequent attempt, the POS device might always accept the payment instrument, thus emulating the online experience (by temporarily "declining" some transactions) while not actually leaving the customer unable to pay for the purchased good or service.

Figure 3:
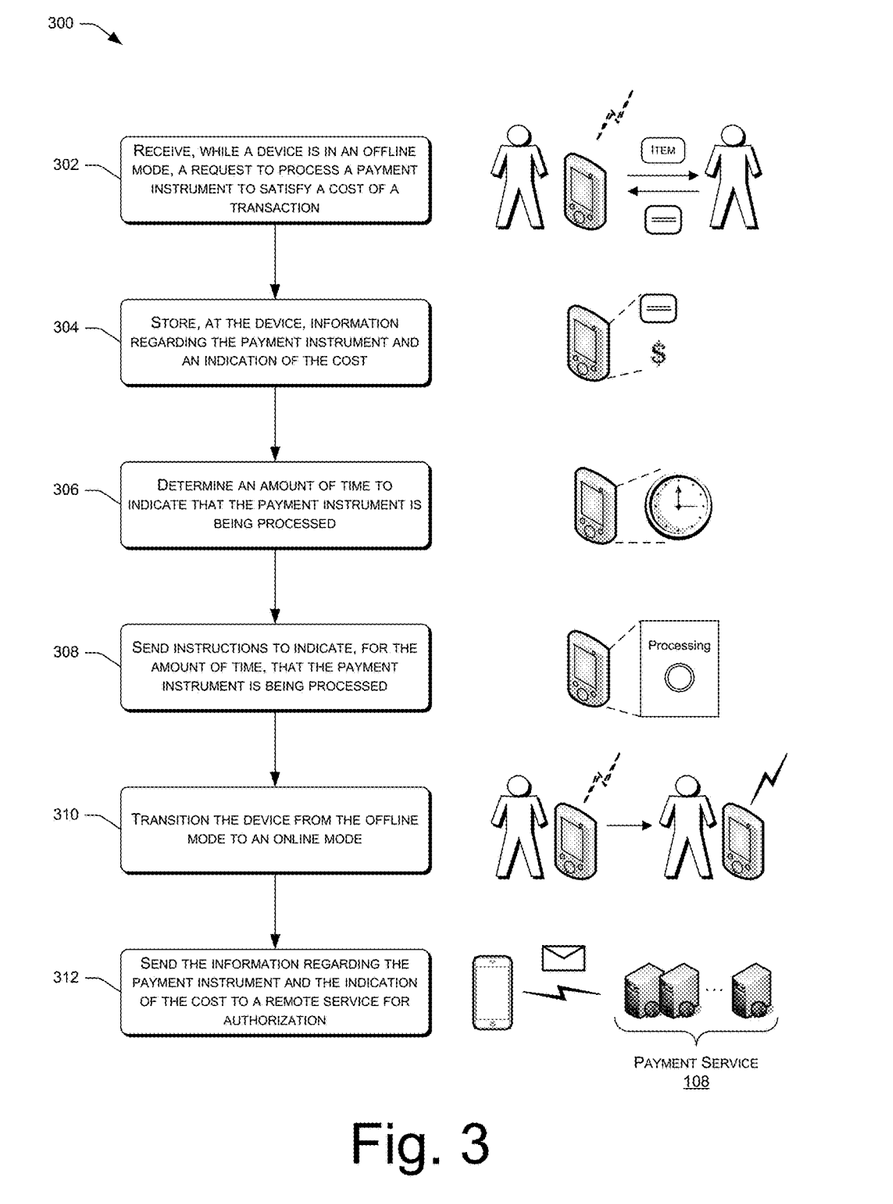
FIG. 3 illustrates a flow diagram of a process that includes a POS device inserting an artificial delay into an offline transaction to cause the offline transaction to more closely resemble an online transaction.

FIG. 3 illustrates a flow diagram of a process 300 that includes a POS device inserting an artificial delay into an offline transaction to cause the offline transaction to more closely resemble an online transaction. The process 300 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

At 302, a POS device receives, while the device is in an offline state or mode, a request to process a payment instrument to satisfy a cost of a transaction between a merchant and a customer. Because the POS device is in the offline mode, at 304, the device locally stores information regarding the payment instrument along with other transaction information (e.g., a cost of the transaction, etc.).

At 306, the POS device determines an amount of time indicate that the payment instrument is being processed. This may be calculated by the POS device itself, may be calculated a priori at a remote payment service, or the like. In some instances, the amount of time is based at least in part on authorization delays for online transactions that have occurred on the POS device or on another POS device.

At 308, the POS device sends instructions to indicate, for the amount of time and on the display of the device, that the payment instrument is being processed. In some examples, the POS device may display the word "processing" or the like to indicate to a user of the device that the payment instrument is being processed. In other instances, meanwhile, the POS device may provide this indication in another manner, such as audibly via a speaker of the device. After the expiration of the amount of time, the POS device may indicate that the payment instrument has been processed.

At 310, the device transitions from the offline mode to the online mode. This may be in response to the device gaining network connectivity, a user of the device manually transitioning a merchant application executing on the device back to the online mode, or the like. In either case, at 312, the POS device sends the information regarding the payment instrument and the transaction information (e.g., the indication of the cost of the transaction) to a remote service for authorization. After the remote service processes the payment instrument and determines whether the payment instrument is approved or declined, the POS device may display a corresponding notification to the merchant.

Figure 4:
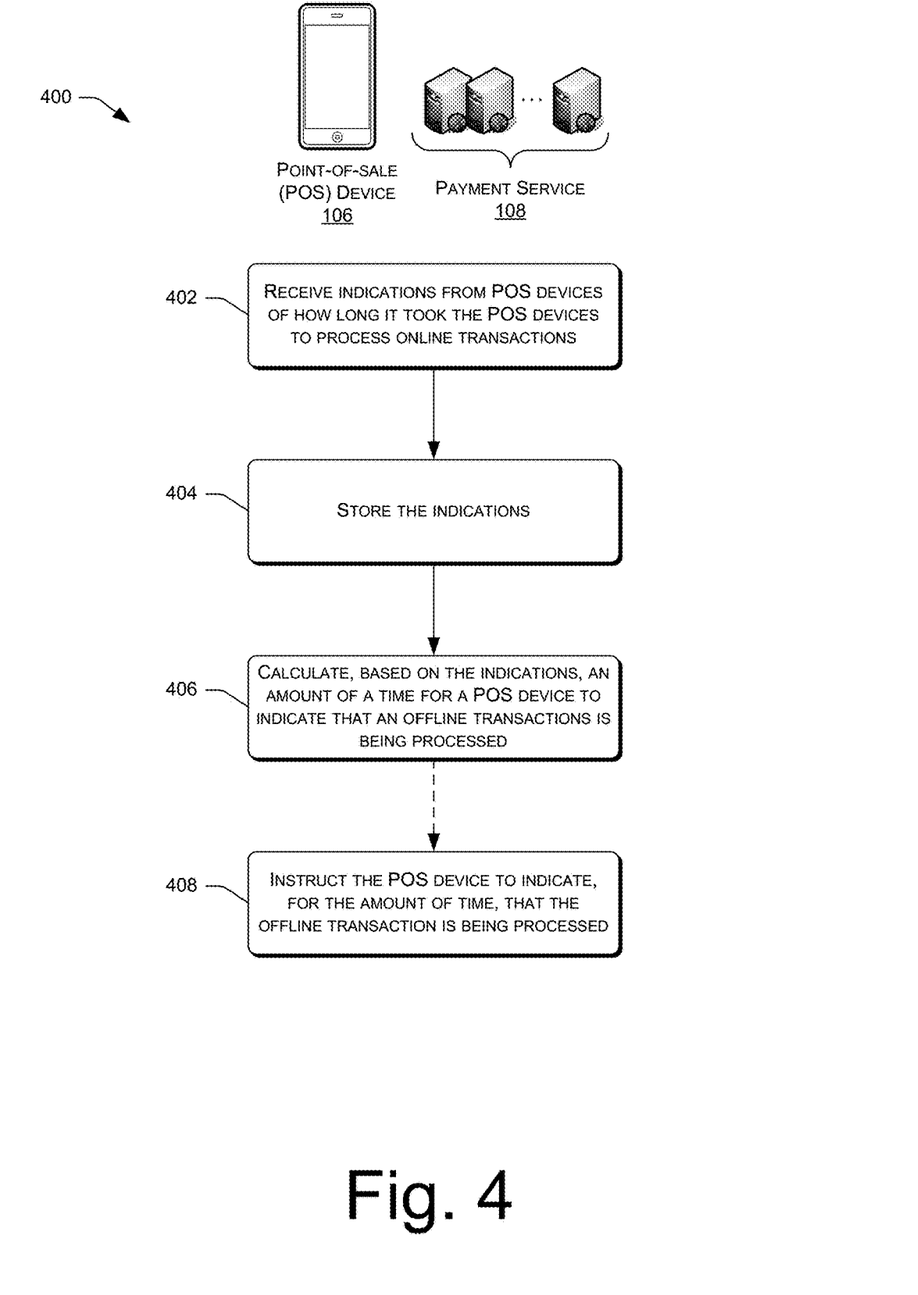
FIG. 4 illustrates a flow diagram of a process for determining a length of an artificial delay to insert into an offline transaction based upon authorization times associated with previously conducted online transactions.

FIG. 4 illustrates a flow diagram of a process 400 for determining a length of an artificial delay to insert into an offline transaction based upon authorization times associated with previously conducted online transactions. A POS device, a payment service, or a combination thereof may implement the device 400.

At 402, the process 400 receives indications from POS devices of how long it took the POS devices to process respective online transactions. As described above, this may comprise an indication of the "authorization delay 110" for each online transaction. At 404, the process 400 stores this indications and, at 406, the process 400 calculates, based on the stored indications, an amount of time that a POS device is to indicate that an offline transaction is being processed. That is, the process 400 may determine a length of a "artificial delay 112" to insert into the processing pipeline for an offline transaction. After calculating this amount, the process 400 may instruct a particular POS device to indicate, for the amount of time or based on the amount of time, that a particular offline transaction at the POS device is being processed.

Figure 5:
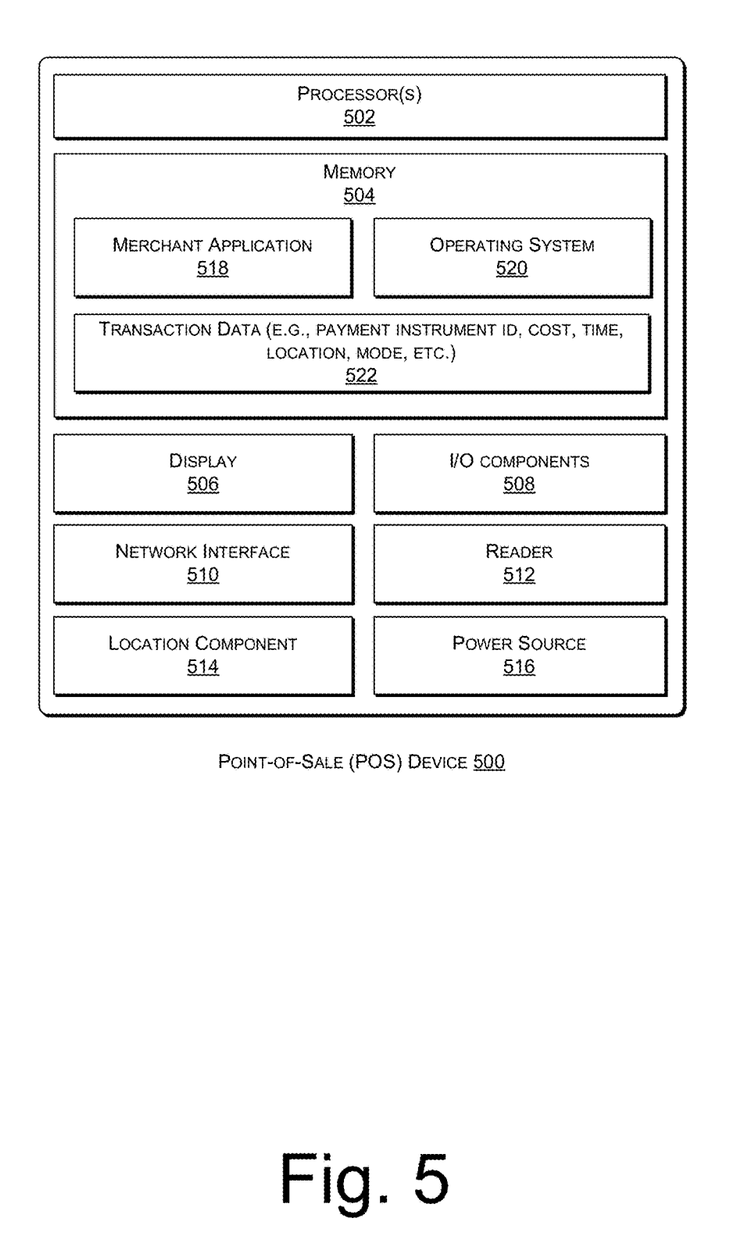
FIG. 5 illustrates select components of a POS device that a merchant described herein may utilize.

FIG. 5 illustrates select example components of an example POS device 500 according to some implementations. The POS device 500 may be any suitable type of computing device, e.g., mobile, semi-mobile, semi-stationary, or stationary. Some examples of the POS device 500 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 500 includes at least one processor 502, memory 504, a display 506, one or more input/output (I/O) components 508, one or more network interfaces 510, at least one card reader 512, at least one location component 514, and at least one power source 516. Each processor 502 may itself comprise one or more processors or processing cores. For example, the processor 502 can be implemented as one or more microprocessors, microcomputers, microcontrollers, digital signal processors, central processing units, state machines, logic circuitries, and/or any devices that manipulate signals based on operational instructions. In some cases, the processor 502 may be one or more hardware processors and/or logic circuits of any suitable type specifically programmed or configured to execute the algorithms and processes described herein. The processor 502 can be configured to fetch and execute computer-readable processor-executable instructions stored in the memory 504.

Depending on the configuration of the POS device 500, the memory 504 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 504 may include, but is not limited to, RAM, ROM, EEPROM, flash memory, solid-state storage, magnetic disk storage, optical storage, and/or other computer-readable media technology. Further, in some cases, the POS device 500 may access external storage, such as RAID storage systems, storage arrays, network attached storage, storage area networks, cloud storage, or any other medium that can be used to store information and that can be accessed by the processor 502 directly or through another computing device or network. Accordingly, the memory 504 may be computer storage media able to store instructions, modules or components that may be executed by the processor 502. Further, when mentioned, non-transitory computer-readable media exclude media such as energy, carrier signals, electromagnetic waves, and signals per se.

The memory 504 may be used to store and maintain any number of functional components that are executable by the processor 502. In some implementations, these functional components comprise instructions or programs that are executable by the processor 502 and that, when executed, implement operational logic for performing the actions and services attributed above to the POS device 500. Functional components of the POS device 500 stored in the memory 504 may include a merchant application 518, discussed above. The merchant application 518 may present an interface on the POS device 500 to enable the merchant to conduct transactions, receive payments, and so forth, as well as communicating with the payment service 108 for processing payments and sending transaction information. Further, the merchant application 518 may present an interface to enable the merchant to manage the merchant's account, and the like. Additional functional components may include an operating system 520 for controlling and managing various functions of the POS device 500 and for enabling basic user interactions with the POS device 500. The memory 504 may also store transaction data 522 that is received based on the merchant associated with the POS device 500 engaging in various transactions with customers.

In addition, the memory 504 may also store data, data structures and the like, that are used by the functional components. For example, this data may include item information that includes information about the items offered by the merchant, which may include images of the items, descriptions of the items, prices of the items, and so forth. Depending on the type of the POS device 500, the memory 504 may also optionally include other functional components and data, which may include programs, drivers, etc., and the data used or generated by the functional components. Further, the POS device 500 may include many other logical, programmatic and physical components, of which those described are merely examples that are related to the discussion herein.

The network interface(s) 510 may include one or more interfaces and hardware components for enabling communication with various other devices over the network or directly. For example, network interface(s) 510 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 5 further illustrates that the POS device 500 may include the display 506 mentioned above. Depending on the type of computing device used as the POS device 500, the display 506 may employ any suitable display technology. For example, the display 506 may be a liquid crystal display, a plasma display, a light emitting diode display, an OLED (organic light-emitting diode) display, an electronic paper display, or any other suitable type of display able to present digital content thereon. In some examples, the display 506 may have a touch sensor associated with the display 506 to provide a touchscreen display configured to receive touch inputs for enabling interaction with a graphic interface presented on the display 506. Accordingly, implementations herein are not limited to any particular display technology. Alternatively, in some examples, the POS device 500 may not include the display 506, and information may be present by other means, such as aurally.

The I/O components 508, meanwhile, may include speakers, a microphone, a camera, and various user controls (e.g., buttons, a joystick, a keyboard, a keypad, etc.), a haptic output device, and so forth.

In addition, the POS device 500 may include or may be connectable to a payment instrument reader 512. In some examples, the reader 512 may detachably couple (e.g., plug in to a port) to the merchant electronic device, such as a microphone/headphone port, a data port, or other suitable port. In other instances, the reader 512 is integral with the entire POS device 500. The reader may include a read head for reading a magnetic strip of a payment card, and further may include encryption technology for encrypting the information read from the magnetic strip. Alternatively, numerous other types of card readers may be employed with the POS devices 500 herein, depending on the type and configuration of a particular POS device 500.

The location component 514 may include a GPS device able to indicate location information, or the location component 514 may comprise another other location-based sensor. The POS device 500 may also include one or more additional sensors (not shown), such as an accelerometer, gyroscope, compass, proximity sensor, and the like. Additionally, the POS device 500 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
   a point of sale (POS) device associated with a merchant, the POS device comprising:
   a port;

a payment reader configured to read payment instruments and detachably couple to the port;
a display;
one or more processors; and
one or more computer-readable media storing instructions executable by the one or more processors, wherein the instructions program the one or more processors to:
receive, while the POS device operates in an offline mode, a request to process a payment instrument to satisfy a cost of a transaction;
determine that the POS device is operating in the offline mode;
store, at the POS device and based at least in part on determining that the POS device is operating in the offline mode, information regarding the payment instrument and an indication of the cost of the transaction;
determine an amount of time to indicate on the display that the payment instrument is being processed, the amount of time based at least in part on a time taken to process a previous transaction with a previous payment instrument that occurred while the POS device or another POS device was operating in an online mode;
display, for at least the amount of time, an indication that the payment instrument is being processed, the indication representing an artificial processing delay;
transition, based at least in part on determining that the POS device has established network connectivity, from the offline mode to the online mode; and
send, based at least in part on transitioning from the offline mode to the online mode, the information regarding the payment instrument and the indication of the cost of the transaction to a remote service; and
a remote system configured to receive the information regarding the payment instrument and the indication of the cost of the transaction.

2. The system as recited in claim 1, wherein the time taken to process the previous transaction includes a time to:
send, to the remote service, information regarding the previous payment instrument;
receive, from the remote service, an indication that the previous payment instrument was approved or declined; and
present, on the display of the POS device or on another display of the other POS device the indication that the previous payment instrument was approved or declined.

3. The system as recited in claim 1, wherein the amount of time is based at least in part on an average amount of time taken to process transactions that occurred while the POS device or the another POS device operated in the online mode.

4. The system as recited in claim 1, wherein the indication comprises a first indication, and the first indication is based at least in part on, but different than, a second indication presented on the display when the POS device operates in the online mode.

5. A point-of-sale (POS) device comprising:
one or more processors; and
one or more computer-readable media storing instructions executable by the one or more processors, wherein the instructions program the one or more processors to:
receive, while operating in an offline mode, a request to process a payment instrument to satisfy a cost of a transaction;
store information regarding the payment instrument and the cost of the transaction based at least in part on the POS device operating in the offline mode;
display simulated processing of the transaction on a screen associated with the POS device, the simulated processing displayed for an amount of time, the amount of time based at least in part on at least one of a predefined amount of time or one or more previous transactions at the POS device when the POS device was operating in an online mode;
transition, based at least in part on an indication that network connectivity has been established with the POS device, the POS device from the offline mode to the online mode; and
send the information to a remote service based at least in part on transitioning from the offline mode to the online mode.

6. The POS device as recited in claim 5, wherein the POS device operates in the offline mode based at least in part on at least one of the POS device lacking network connectivity or an operator of the POS device selecting the offline mode.

7. The POS device as recited in claim 5, wherein the amount of time is based at least in part on an average amount of time used to process previous transactions at the POS device when operating in the online mode.

8. The POS device as recited in claim 5, wherein the amount of time comprises an average amount of time used to process previous transactions at the POS device when operating in the online mode, with an amount of randomness added or subtracted from the average amount of time.

9. The POS device as recited in claim 5, wherein:
the payment instrument comprises a first payment instrument;
the transaction comprises a first transaction;
the amount of time comprises a first amount of time; and
the instructions further program the one or more processors to:
receive, while operating in the offline mode, a request to process a second payment instrument to satisfy a cost of a second transaction;
store information regarding the second payment instrument and the cost of the second transaction; and
display simulated processing of the second transaction on the screen, the simulated processing displayed for a second amount of time, the second amount of time differing from the first amount of time.

10. The POS device as recited in claim 5, wherein the instructions further program the one or more processors to display, after expiration of the amount of time, an indication that the payment instrument has been successfully processed.

11. The POS device as recited in claim 10, wherein displaying the indication that the payment instrument has been successfully processed is based at least in part on an amount of payment instruments that have been successfully authorized when the POS device operated in the online mode.

12. The POS device as recited in claim 5, wherein the amount of time is based at least in part on a geographic location of the POS device.

13. The POS device as recited in claim 5, wherein the simulated processing includes inserting an artificial delay into the transaction.

14. The POS device as recited in claim 5, wherein display of the simulated processing corresponds to display of transaction processing in the online mode.

15. One or more non-transitory computer-readable media associated with a point-of-sale (POS) device, the one or more non-transitory computer-readable media storing computer-executable instructions that, when executed, cause one or more processors to perform acts comprising:
- determining an amount of time to insert an artificial delay into a transaction utilizing the POS device while the POS device is operating in an offline mode, the amount of time based at least in part on a previous amount of time to process a payment instrument to satisfy a cost of a previous transaction while the POS device or another POS device was operating in an online mode;
- displaying, while the POS device is operating in the offline mode and for the amount of time, an indication that the transaction is being processed;
- transitioning, based at least in part on determining that the POS device has established network connectivity, from the offline mode to the online mode; and
- sending, based at least in part on the transitioning, information regarding the transaction to a remote service for authorization of the transaction.

16. The one or more non-transitory computer-readable media as recited in claim 15, wherein the indication that the transaction is being processed comprises a simulation that the transaction is being processed.

17. The one or more non-transitory computer-readable media as recited in claim 15, wherein the amount of time is based at least in part on a type of payment instrument utilized for the transaction.

18. The one or more non-transitory computer-readable media as recited in claim 15, wherein the indication that the transaction is being processed comprises a first indication, and the first indication differs from a second indication displayed when the POS device operates in the online mode.

19. The one or more non-transitory computer-readable media as recited in claim 15, wherein the artificial delay is based at least in part on an average processing time of multiple payment instruments.

20. One or more non-transitory computer-readable media associated with one or more computing devices associated with a payment service, the one or more non-transitory computer-readable media storing computer-executable instructions that, when executed, cause one or more processors to perform acts comprising:
- storing data representing one or more previous amounts of time to process a type of payment instrument by multiple point-of-sale (POS) devices operating in an online mode;
- determining, based at least in part on the one or more previous amounts of time, an amount of time to insert an artificial delay into a transaction using at least one POS device of the multiple POS devices in an offline mode;
- sending the amount of time to insert the artificial delay into the transaction to the at least one POS device operating in the offline mode to display, for the amount of time, an indication that the transaction is being processed; and
- receiving information regarding the transaction for authorization of the transaction by the payment service from the at least one POS device based at least in part on the POS device transitioning from the offline mode to the online mode.

21. The one or more non-transitory computer-readable media as recited in claim 20, the acts further comprising instructing the at least one of the POS devices to simulate, for the amount of time, that the transaction is being processed.

22. The one or more non-transitory computer-readable media as recited in claim 21, wherein the offline mode is based at least in part on the POS device lacking network connectivity.

* * * * *

UNITED STATES PATENT AND TRADEMARK OFFICE
CERTIFICATE OF CORRECTION

PATENT NO.        : 10,055,721 B1
APPLICATION NO.   : 14/274524
DATED             : August 21, 2018
INVENTOR(S)       : Christopher Lang Mocko et al.

It is certified that error appears in the above-identified patent and that said Letters Patent is hereby corrected as shown below:

Column 13, Line 17, change "offline mode and for the amount of time, an indication" to -- offline mode and for the amount of time associated with the artificial delay, an indication --.

Signed and Sealed this
Thirteenth Day of November, 2018

Andrei Iancu
*Director of the United States Patent and Trademark Office*